(12) United States Patent
Numata et al.

(10) Patent No.: US 10,649,272 B2
(45) Date of Patent: May 12, 2020

(54) DISPLAY DEVICE

(71) Applicant: Japan Display Inc., Minato-ku (JP)

(72) Inventors: Yudai Numata, Tokyo (JP); Takeo Koito, Tokyo (JP)

(73) Assignee: Japan Display Inc., Minato-ku (JP)

( * ) Notice: Subject to any disclaimer, the term of this patent is extended or adjusted under 35 U.S.C. 154(b) by 127 days.

(21) Appl. No.: 15/866,527

(22) Filed: Jan. 10, 2018

(65) Prior Publication Data

US 2018/0239190 A1 Aug. 23, 2018

(30) Foreign Application Priority Data

Feb. 17, 2017 (JP) ................................. 2017-027615

(51) Int. Cl.
| | |
|---|---|
| *G02F 1/1335* | (2006.01) |
| *G02B 5/126* | (2006.01) |
| *G02B 27/22* | (2018.01) |
| *G02B 5/124* | (2006.01) |

(52) U.S. Cl.
CPC ....... *G02F 1/133553* (2013.01); *G02B 5/124* (2013.01); *G02B 5/126* (2013.01); *G02B 27/2292* (2013.01); *G02F 1/133528* (2013.01); *G02F 1/133536* (2013.01); *G02F 2001/133548* (2013.01)

(58) Field of Classification Search
CPC .... G02B 27/2292; G02B 5/124; G02B 5/126; G02B 27/0977; G02B 27/0983; G02B 5/30; G02B 5/12; G02F 1/133553; G02F 1/133528; G02F 2001/133548; G02F 1/133536; G06K 2019/0629; G01N 2021/8819; G01N 2021/551
See application file for complete search history.

(56) References Cited

U.S. PATENT DOCUMENTS

| | | | | |
|---|---|---|---|---|
| 2010/0177402 | A1* | 7/2010 | Maekawa | G02B 5/124 359/629 |
| 2015/0153577 | A1* | 6/2015 | Nikitin | G02B 27/2292 250/200 |
| 2017/0031157 | A1* | 2/2017 | Koito | G02B 27/0018 |
| 2017/0242173 | A1* | 8/2017 | Numata | G02B 5/08 |
| 2017/0285359 | A1* | 10/2017 | Numata | G02B 5/124 |
| 2017/0285402 | A1* | 10/2017 | Koito | G02F 1/133553 |
| 2018/0024373 | A1* | 1/2018 | Joseph | G02B 27/22 359/629 |

(Continued)

FOREIGN PATENT DOCUMENTS

| | | |
|---|---|---|
| DE | 10 2012 105 170 B3 | 9/2013 |
| JP | 2011-253128 | 12/2011 |

*Primary Examiner* — Jia X Pan
(74) *Attorney, Agent, or Firm* — Oblon, McClelland, Maier & Neustadt, L.L.P.

(57) ABSTRACT

According to one embodiment, a display device includes a display which emits display light, an optical element including a transmission axis which transmit first linearly polarized light, which reflects second linearly polarized light crossing the transmission axis and a retroreflective element which retroreflects the display light, and the retroreflective element includes a first portion including a first surface, a second portion including a second surface and a third portion disposed between the first surface and the second surface, and an angle made by the first surface and the second surface is greater than 0° and less than 180°.

11 Claims, 15 Drawing Sheets

(56) References Cited

U.S. PATENT DOCUMENTS

2018/0164596 A1* 6/2018 Houzyou ............... G02B 5/124
2018/0284470 A1* 10/2018 Yamamoto ......... G02B 27/2292
2019/0179062 A1* 6/2019 Nawata ................ G02B 5/3025

* cited by examiner

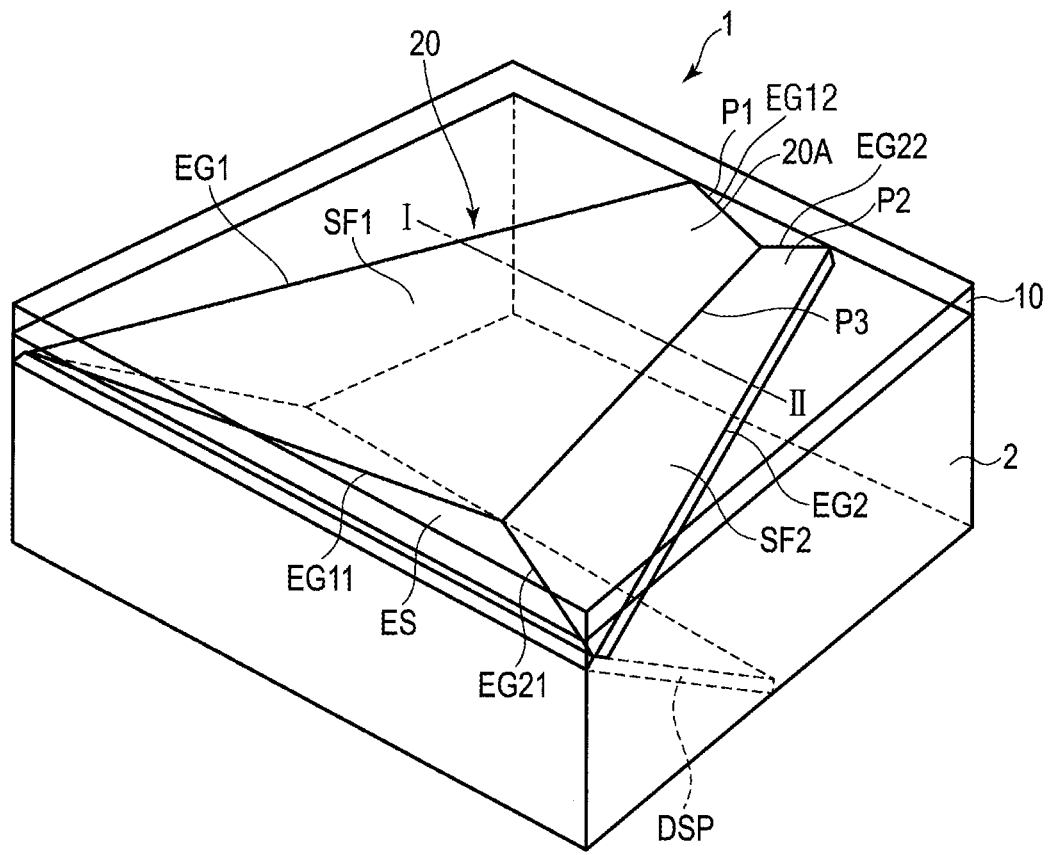
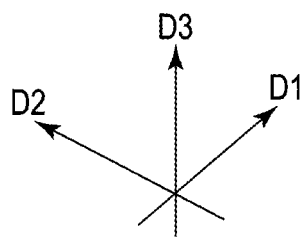
F I G. 1

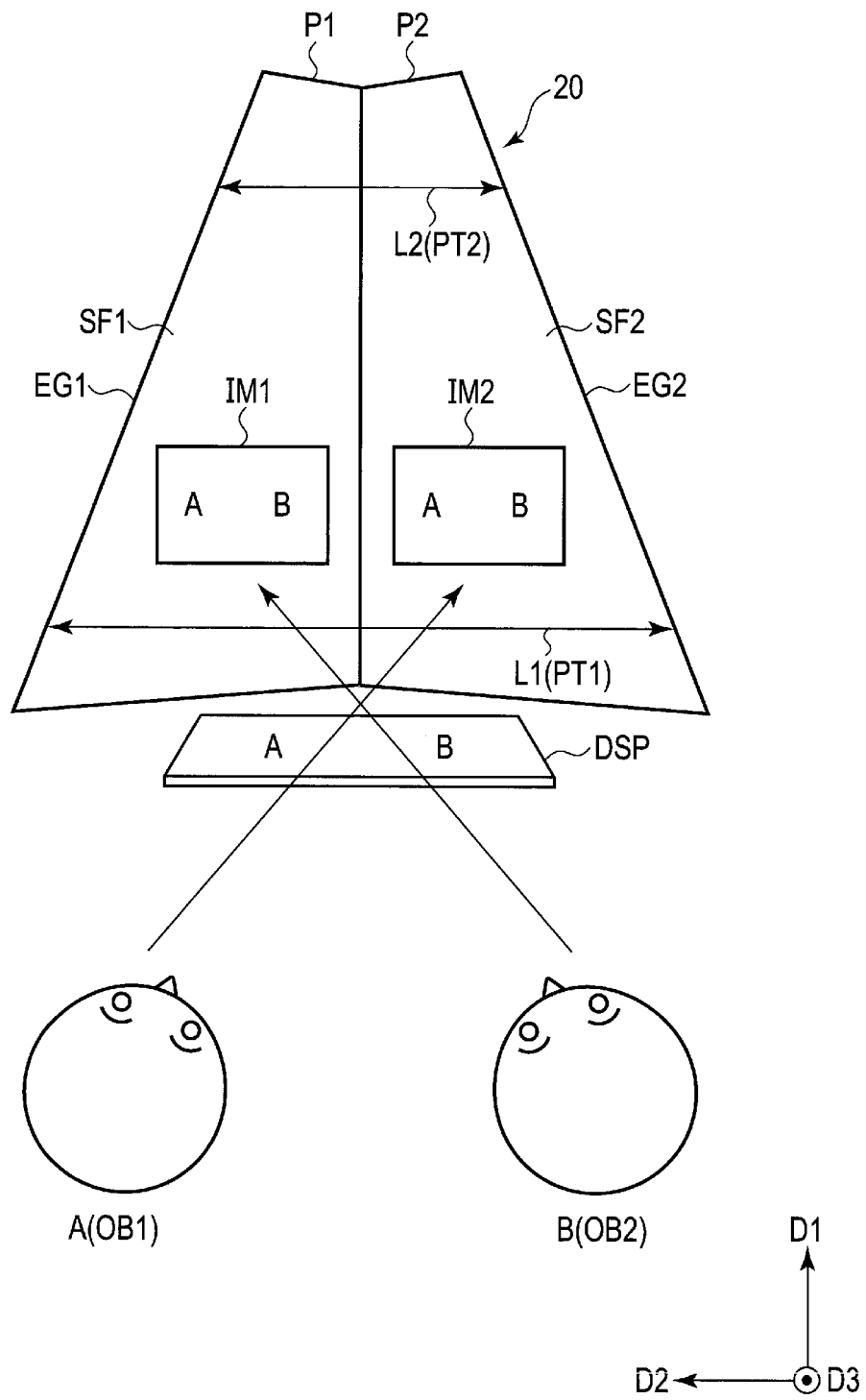
F I G. 5

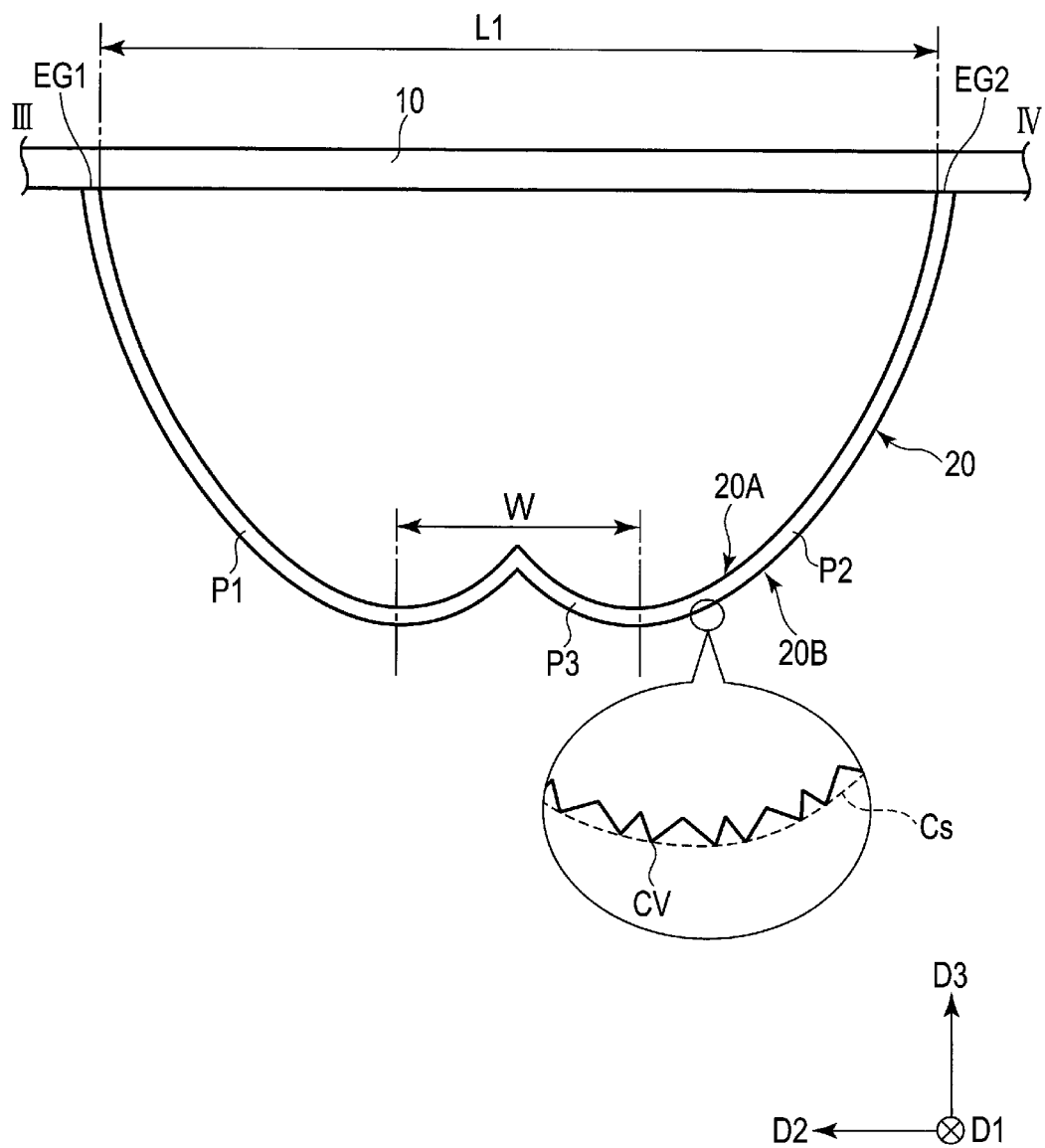
F I G. 12

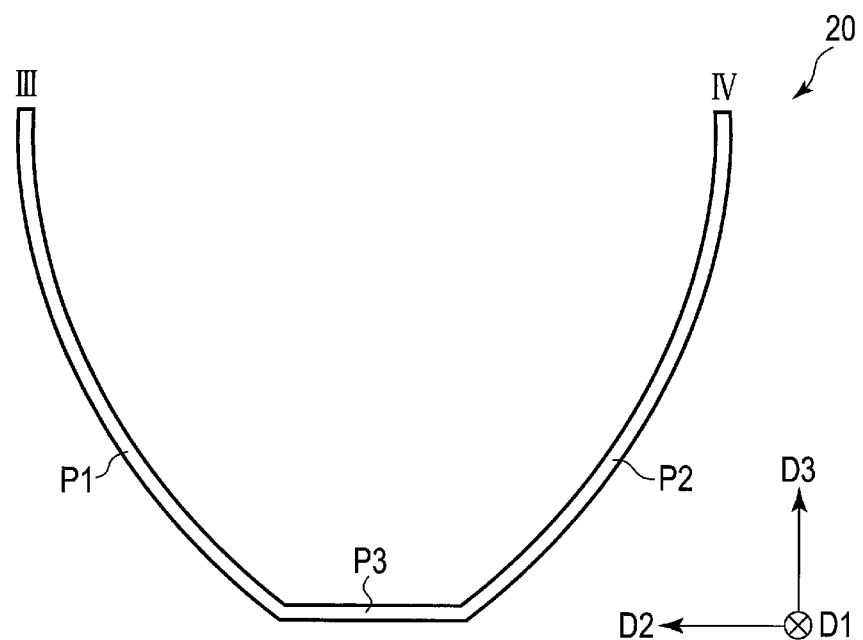
F I G. 13
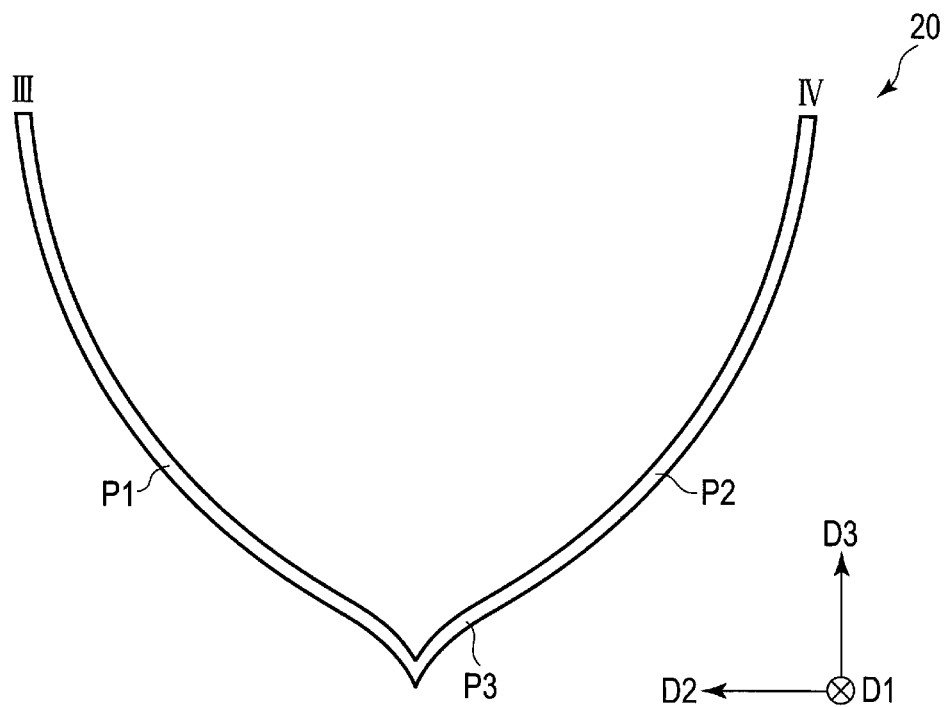
F I G. 14

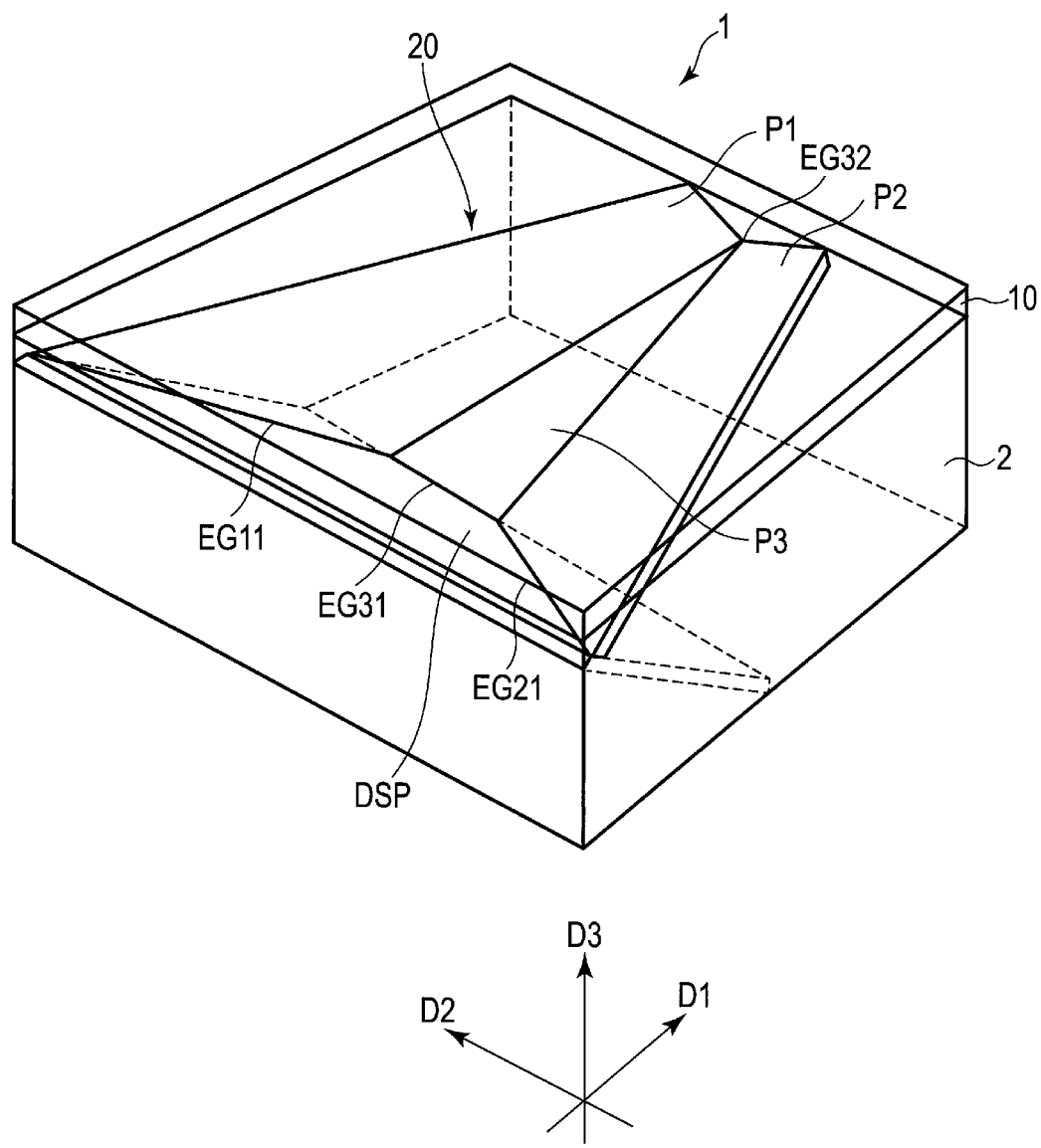
F I G. 15

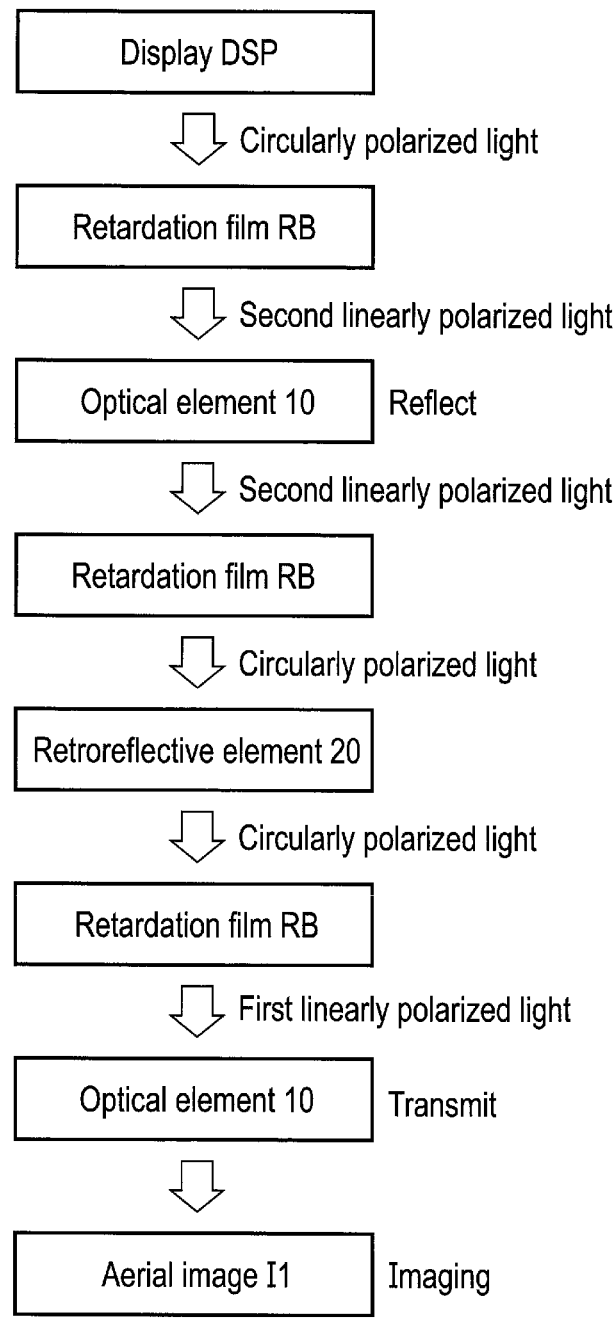
F I G. 17

DISPLAY DEVICE

CROSS-REFERENCE TO RELATED APPLICATIONS

This application is based upon and claims the benefit of priority from Japanese Patent Application No. 2017-027615, filed Feb. 17, 2017, the entire contents of which are incorporated herein by reference.

FIELD

Embodiments described herein relate generally to a display device.

BACKGROUND

An imaging device comprising, for example, a polarizing filter and retroreflective prism has been proposed. The imaging device forms a real image, which is an image which expresses a display image at a position plane-symmetric to the emitting point of display light which shows a display image with respect to the polarizing filter. Here, for example, a technique of curving the retroreflective prism is known to expand the visible range of display image.

BRIEF DESCRIPTION OF THE DRAWINGS

FIG. 1 is a perspective view showing a configuration example of a display device of this embodiment.

FIG. 5 is a diagram showing positions of the retroreflective element and an observer with relation to each other.

FIG. 12 is a cross section showing a structure of the retroreflective element taken along line III-IV in FIG. 11.

FIG. 13 is a cross section showing another example of the retroreflective element taken along line III-IV in FIG. 11.

FIG. 14 is a cross section showing still another embodiment of the retroreflective element cut by the III-IV line shown in FIG. 11.

FIG. 15 is a diagram showing another example of the retroreflective element according to this embodiment.

FIG. 17 is a diagram illustrating the function of each component of the display device shown in FIG. 16.

DETAILED DESCRIPTION

Figure 2:
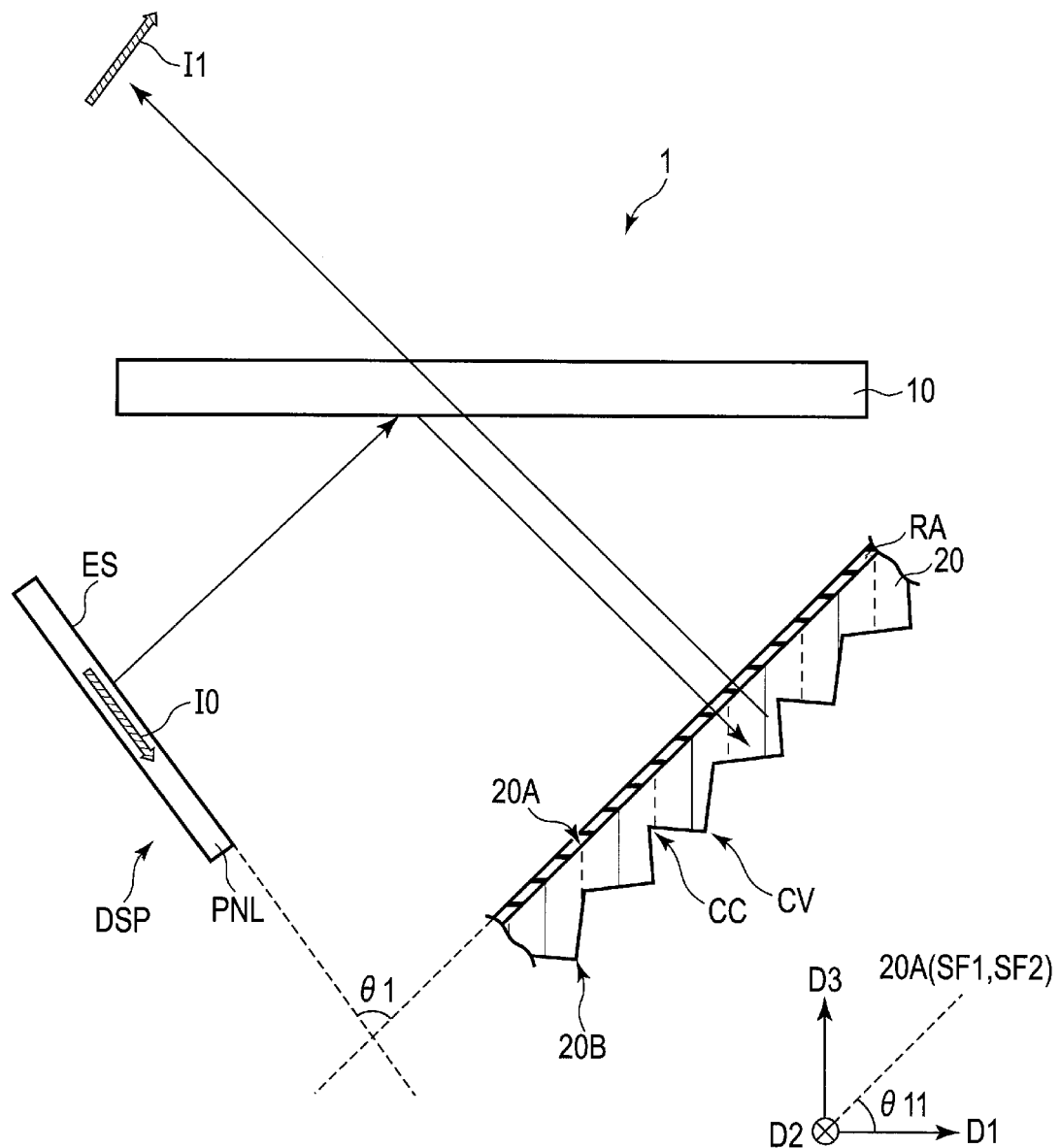
FIG. 2 is a schematic diagram showing the relationship between members of the display device shown in FIG. 1.

In general, according to one embodiment, a display device comprises a display which emits display light, an optical element comprising a transmission axis which transmit first linearly polarized light, which reflects second linearly polarized light crossing the transmission axis and a retroreflective element which retroreflects the display light, the retroreflective element comprising a first portion comprising a first surface, a second portion comprising a second surface and a third portion disposed between the first surface and the second surface, wherein an angle made by the first surface and the second surface is greater than 0° and less than 180°.

According to another embodiment, a display device comprises a display which emits display light, an optical element comprising a transmission axis which transmit first linearly polarized light and reflecting second linearly polarized light crossing the transmission axis and a retroreflective element which retroreflects the display light, the retroreflective element comprising a concave first portion, a concave second portion and a convex third portion disposed between the first portion and the second portion.

According to another embodiment, a display device comprises a display which emits display light, an optical element comprising a transmission axis which transmit first linearly polarized light and reflecting second linearly polarized light crossing the transmission axis and a retroreflective element which retroreflects the display light, the retroreflective element comprising a first portion comprising a first surface and a second portion comprising a second surface, the first surface and the second surface crossing in a straight portion, wherein an angle made by the first surface and the second surface is greater than 0° and less than 180°.

According to another embodiment, a display device comprises a display which emits display light, an optical element comprising a transmission axis which transmit first linearly polarized light and reflecting second linearly polarized light crossing the transmission axis and a retroreflective element which retroreflects the display light, the retroreflective element comprising a first portion comprising a first surface, a second portion comprising a second surface and a third portion provided between the first surface and the second surface and comprising a polygonal third surface, wherein an angle made between the first surface and the second surface is greater than 0° and less than 180°.

Embodiments will now be described with reference to accompanying drawings. Note that the disclosure is presented for the sake of exemplification, and any modification and variation conceived within the scope and spirit of the invention by a person having ordinary skill in the art are naturally encompassed in the scope of invention of the present application. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Further, in the specification and drawings, the structural elements, which have functions identical or similar to the functions described in connection with preceding drawings, are denoted by like reference numbers, and an overlapping detailed description thereof is omitted unless otherwise necessary.

FIG. 1 is a perspective view showing a configuration example of a display device 1 of an embodiment. More specifically, the display device 1 comprises a housing 2, an optical element 10, a display DSP, a retroreflective element 20 and the like. FIG. 1 shows a three-dimensional space defined by a first direction D1, a second direction D2 crossing the first direction D1 and a third direction D3 crossing the first direction D1 and the second direction D2.

In the example illustrated, the first direction D1, the second direction D2 and the third direction D3 are orthogonal to each other.

In this embodiment, a plane defined by the first direction D1 and the second direction D2 is referred to as a D1-D2 plane, that defined by the second direction D2 and the third direction D3 is referred to as a D2-D3 plane and that defined by the first direction D1 and the third direction D3 is referred to as a D1-D3 plane. Moreover, in this embodiment, a positive direction of the third direction D3 is defined as above or up, and a negative direction of the third direction D3 is defined as below or down.

The housing 2 accommodates the retroreflective element 20 and the display DSP. In the example illustrated, the housing 2 has such a shape which opens its upper side. The optical element 10 is disposed on the housing 2 along the D1-D2 plane. In the example illustrated, the optical element 10 is formed into a rectangular shape along the D1-D2 plane, but may be formed into some other shape.

The display DSP comprises an emission surface ES which emits display light, which is circularly polarized light or linearly polarized light, towards the optical element 10. In the example illustrated, the emission surface ES is inclined with respect to the D2-D3 plane. That is, the display DSP is inclined to direct the emission surface ES towards the optical element 10. Note that the display DSP may be disposed parallel to the D2-D3 plane. In this embodiment, the display light refers to the light emitted from the display DSP.

The retroreflective element 20 retroreflects the display light reflected by the optical element 10. The retroreflective element 20 comprises a first portion P1, a second portion P2 and a third portion P3 between the first portion P1 and the second portion P2. The first portion P1 comprises a first surface SF1 on a side opposing the optical element 10. The first surface SF1 is an inclined plane which crosses all of the first direction D1, the second direction D2 and the third direction D3. The first surface SF1 is inclined to face towards the second portion P2 with respect to the D1-D2 plane. Moreover, the first surface SF1 is inclined to face towards the display DSP with respect to the D1-D2 plane. The second portion P2 comprises a second surface SF2 on a side opposing the optical element 10. The second surface SF2 is an inclined plane which crosses all of the first direction D1, the second directions D2 and the third directions D3. The second surface SF2 is inclined to face towards the first portion P1 with respect to the D1-D2 plane. Further, the second surface SF2 is inclined to face towards the display DSP with respect to the D1-D2 plane. The third portion P3 corresponds to a linear portion in the example illustrated. The third portion P3 corresponds to a portion which connects the first portion P1 and the second portion P2 to each other, and its shape is not particularly limited. As will be described later, the third portion P3 may be formed into a polygon, for example, a triangle comprising a base on a display DSP side or a trapezoid comprising a lower base on the display DSP side and an upper base, which is shorter than the lower base, on an opposite side to the display DSP.

Note that the first surface SF1 and the second surface SF2 shown in FIG. 1 cross each other by the line of intersection, and the line of intersection corresponds to the linear third portion P3. If the third portion P3 is not linear, but polygonal, another plane is provided between the first surface SF1 and the second surface SF2, and this surface thus provided corresponds to the polygonal third portion P3.

In the example illustrated, the first portion P1 comprises an edge EG11 on the display DSP side and an edge EG12 on an opposite side to the display DSP. The second portion P2 comprises an edge EG21 on the display DSP side and an edge EG22 on an opposite side to the display DSP. The edges EG11 and EG21 may be in contact with the emission surface ES. Moreover, the edges EG12 and EG22 may be in contact with the housing 2. The edges EG11, EG12, EG21 and EG22 are formed into, for example, substantially a linear shape. The first portion P1 comprises an edge EG1 on an opposite side to the third portion P3. The second portion P2 comprises an edge EG2 on an opposite side to the third portion P3. As shown in FIG. 1, the edges EG1 and EG2 are each formed into a single linear shape.

The display DSP is configured to emit display light in a region between the edges EG11 and EG21, and comprises a display panel which emits display light from between the edges EG11 and EG21d, and the like.

The first surface SF1 occupies about 40% or more of a total area of the retroreflective element 20 and the second surface SF2 occupies about 40% or more of the total area of the retroreflective element 20. In the example shown in FIG. 1, the total area of the retroreflective element 20 is equivalent to a sum of the area of the first surface SF1 and that of the second surface SF2.

FIG. 2 is a schematic diagram showing the relationship between members of the display device 1 shown in FIG. 1.

The optical element 10 has comprises a transmission axis which transmits first linearly polarized light and reflects second linearly polarized light which crosses the transmission axis. For example, the first linearly polarized light is P wave parallel to an incident surface and the second linearly polarized light is S wave perpendicular to the incident surface. The optical element 10 described above is formed from, for example, a wire grid polarizing filter, a reflective polarization film to which a brightness enhancement film is applied, a multilayer structure in which the reflective polarization film and a linear polarizer are stacked one on another, or the like. When the optical element 10 is formed from a multilayer structure, the linear polarizer is provided on the reflective polarization film and also comprises a transmission axis parallel to the transmission axis of the reflective polarization film.

In the structure shown in FIG. 2, the display DSP emits second linearly polarized display light towards the optical element 10. In the example illustrated, the display DSP comprises a display panel PNL. That is, the display panel PNL emits the display light which shows a display image I0 and the display light here is the second linearly polarized light.

The display panel PNL is, for example, a liquid crystal display panel in which a liquid crystal layer is held between a pair of substrates, and comprises a polarizer with a transmission axis which transmits second linearly polarized light, on an emission side of the liquid crystal display panel. Here, the display panel PNL may be a self-luminous display panel such as an organic electroluminescent display device, an electronic paper display device comprising an electrophoretic element or the like, a display panel employing micro-electromechanical systems (MEMS), a display panel employing electrochromism or the like.

The liquid crystal display panel may be of a transmissive type which displays images by selectively light from the light source, or a reflective type which displays images by selectively reflecting external light or light from an light source, or trans-reflective type having the display functions of both the transmissive and reflective types.

The display DSP may comprise a screen on which emission light emitted from a projector is projected, or a display medium (a poster or the like) to be illuminated by an illumination device, in place of the display panel.

The retroreflective element 20 comprises a front surface 20A opposing the optical element 10 and a rear surface 20B opposite to the front surface 20A. In the example illustrated, the front surface 20A is flat. Here, the front surface 20A is equivalent to the first surface SF1 or the second surface SF2 shown in FIG. 1. The rear surface 20B is an uneven surface comprising concavities CC and the convexities CV. The convexities CV project toward an opposite side to the optical element 10. Let us focus on a section of the retroreflective element 20 taken along the D1-D3 plane. In the example illustrated, the front surface 20A (that is, the first surface SF1 or second surface SF2) is positioned at an angle θ11, which is greater than 0° but less than 90°, with respect to the first direction D1.

The retroreflective element 20 is formed from, for example, a resin material. The retroreflective element 20 retroreflects the display light in the interface between the resin material and air. Most of the incident light entering the retroreflective element 20 is retroreflected or scattered in the rear surface 20B without passing through the rear surface 20B. Note that a reflective film may be formed to cover the uneven surface as will be described later in FIG. 16.

A retardation film RA is disposed on a front surface 20A side of the retroreflective element 20. The retardation film RA used here is, for example, a λ/4 plate which imparts a phase difference of approximately 1/4λ to the transmitting light. Here, λ is the wavelength of transmission light. Although details will be omitted, the retardation film RA is disposed such that the slow axis thereof crosses the plane of polarization of linearly polarized light at an angle of 45°. In the example illustrated, the retardation film RA is attached to the front surface 20A, but it may be located to apart from the front surface 20A.

In the figure, an aerial image I1 is equivalent to a real image of the display image I0 and is formed at a position plane-symmetric with respect to the optical element 10. The light which forms the aerial image I1 is the first linearly polarized light which passed through the optical element 10.

The display DSP and the retroreflective element 20 are arranged along the first direction D1. Here, in this embodiment, an angle θ1 made between the display DSP and the retroreflective element 20 is greater than 0° but less than 180°. More specifically, the angle θ1 made here is equivalent to an angle made between the emission surface ES and the front surface 20A.

Figure 3:
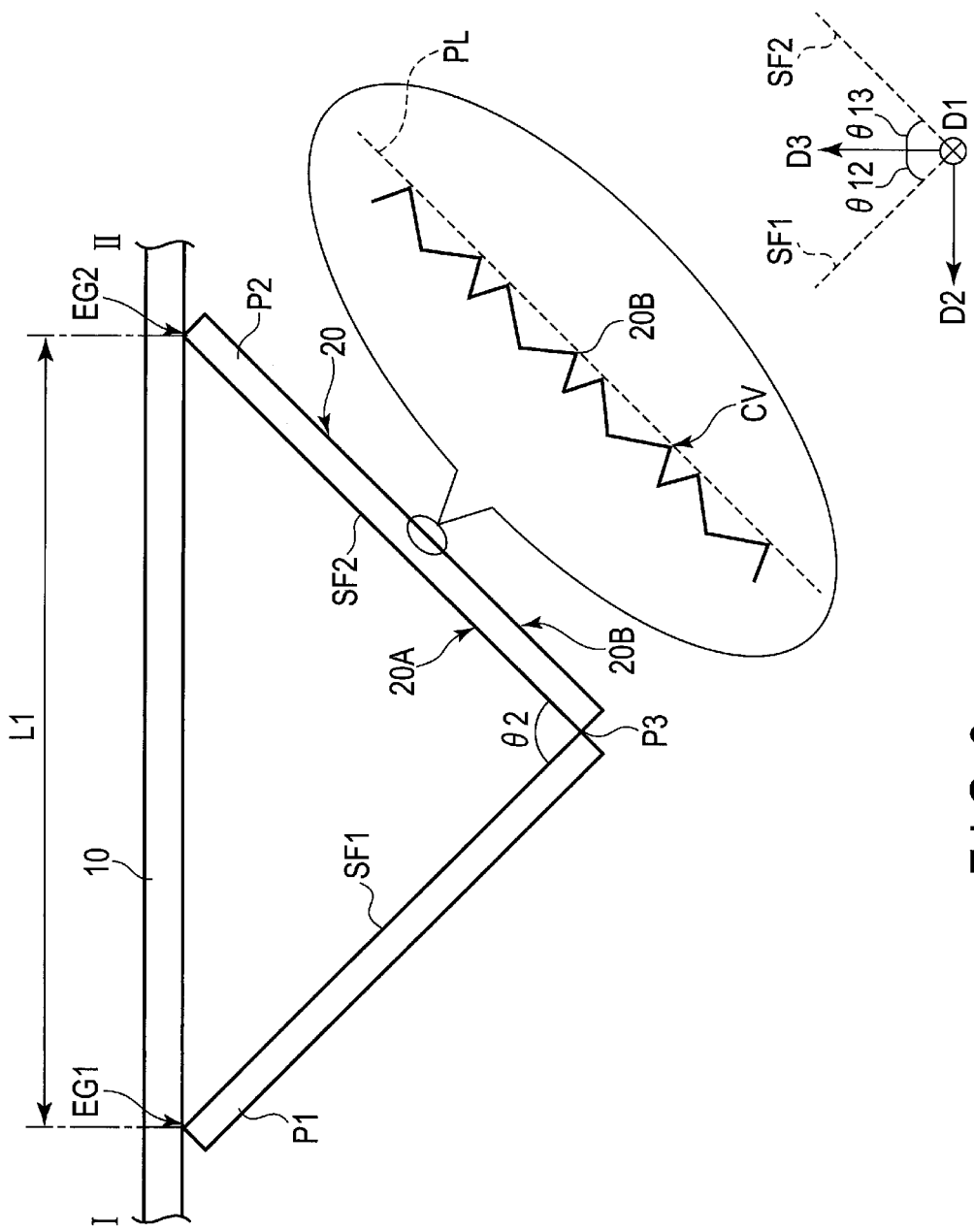
FIG. 3 is a cross section showing a structure of a retroreflective element taken along line I-II in FIG. 1.

FIG. 3 is a cross section showing the structure of the retroreflective element 20 taken along the line I-II in FIG. 1.

The first surface SF1 and the second surface SF2 are arranged along the second direction D2. Here, in this embodiment, an angle θ2 made between the first surface SF1 and the second surface SF2 is greater than 0° but less than 180°. Moreover, for example, the angle θ2 made between the first surface SF1 and the second surface SF2 is an acute angle. The first surface SF1 is positioned at an angle θ12 with respect to the third direction D3, which is greater than 0° but less than 90°. The second surface SF2 is positioned at an angle θ13 with respect to the third direction D3, which is greater than 0° but less than 90°. The angle θ12 and the angle θ13 may be the same as or different from each other.

The first portion P1 comprises an edge (first edge) EG1 and the second portion P2 comprises an edge (second edge) EG2. The edge EG1 is located on an optical element 10 side as compared to the third portion P3 along the third direction D3. The edge EG2 is located on an optical element 10 side with respect to the third portion P3 along the third direction D3.

The edges EG1 and EG2 are arranged along the second direction D2 with a gap therebetween. In the example illustrated, the width of the third portion P3 along the second direction D2 is 0. That is, a gap L1 between the edge EG1 and the edge EG2 along the second direction D2 is greater than the width of the third portion P3 along the second direction D2.

In the example shown in FIGS. 2 and 3, the front surface 20A is flat, whereas the rear surface 20B is uneven, but the front surface 20A may be uneven and the rear surface 20B may flat surface, as will be described later. In the example shown in FIG. 3, tips of the convexities CV are aligned on the plane PL in the rear surface 20B. For this reason, it may be assumed that the rear surface 20B as well is a flat plane and the second portion P2 is a plate-shaped. This is also the case for the first portion P1. Further, even when the front surface 20A is uneven, the tips of the convexities CV are aligned on the plane in the front surface 20A, and therefore it may be assumed that the surface 20A comprises the first surface SF1 and the second surface SF2, as will be described later. Further, it may be assumed that the first portion P1 and the second portion P2 are plates-shaped.

Figure 4:
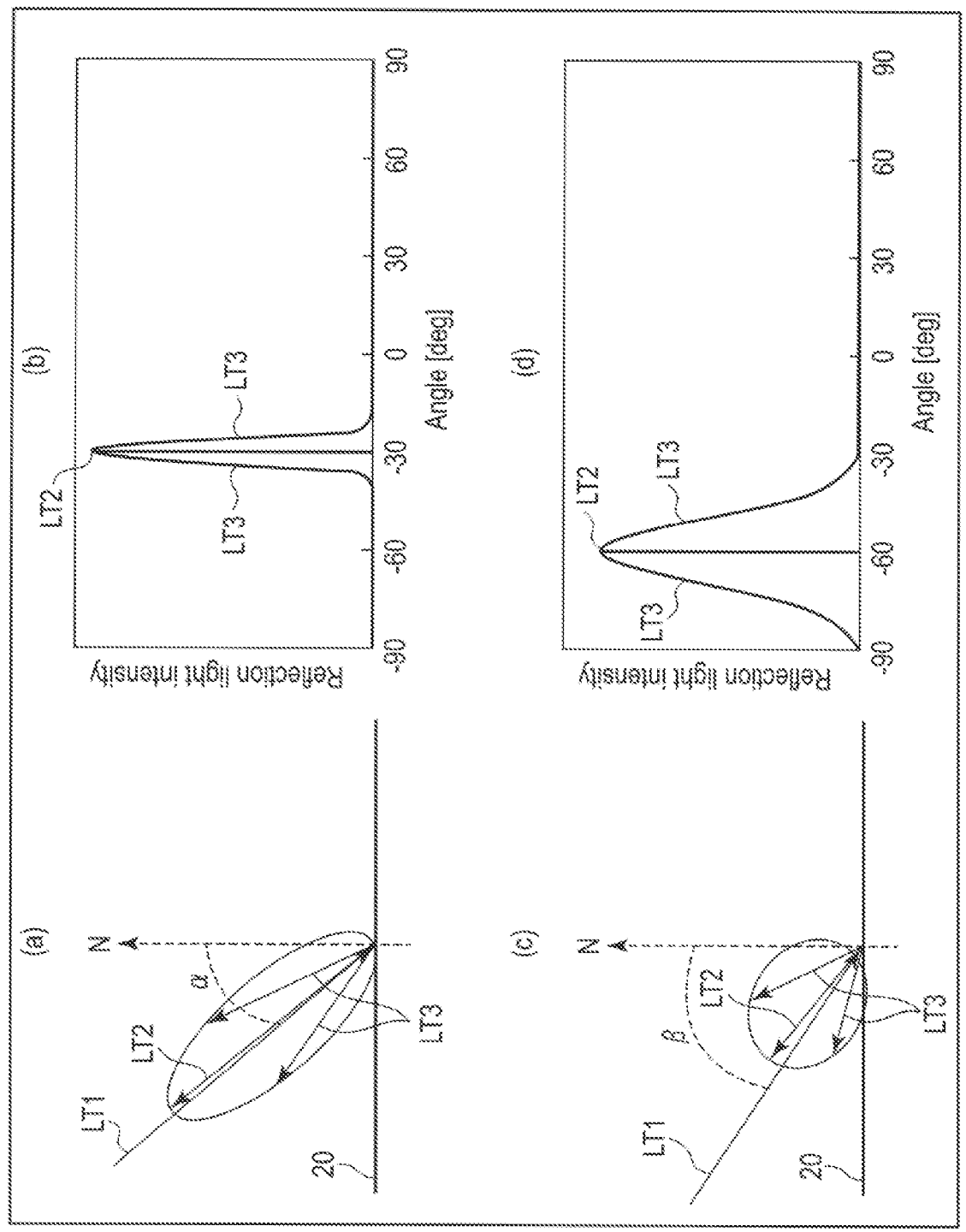
FIG. 4 is a diagram showing an optical performance of the retroreflective element.

FIG. 4 is a diagram showing optical performance of the retroreflective element 20. An incident angle of light entering the retroreflective element 20 and a reflection angle of light retroreflected by the retroreflective element 20, described below are angles with respect to the normal N of the retroreflective element 20.

FIG. 4 shows, in part (a), a case where incident light LT1 enters the retroreflective element 20 at an incident angle α. In FIG. 4, part (a), the incident angle α is about 30°. FIG. 4 shows, in part (b), distribution of reflection angles of retroreflected light LT2 and LT3 shown in FIG. 4, part (a). FIG. 4 shows, in part (c), a case where incident light LT1 enters the retroreflective element 20 at an incident angle β. In FIG. 4, part (c), the incident angle β is about 60°. FIG. 4 shows, in part (d), distribution of reflection angles of retroreflected light LT2 and LT3 shown in FIG. 4, part (c).

In FIG. 4, parts (a) and (c), of the retroreflected light, the reflection light LT2 represents the light reflected at the same reflection angle as the incident angle of the incidence light LT1. The reflection light LT3 represents the light reflected at an angle different from the incident angle of the incidence light LT1. The reflection light LT3 corresponds to the diffusion component of the retroreflection light. In FIG. 4, parts (b) and (d), the horizontal axis indicates the angle of reflection light and the vertical axis indicates the intensity of the reflection light. The intensity of the reflection light LT2 takes the maximum and the intensity of the reflection light LT3 is less than the intensity of the reflection light LT2.

In the example shown in FIG. 4, the incident angle β is greater than the incident angle α. The comparison between parts (b) and (d) of FIG. 4 indicates that the reflection light LT3 distributes in a wider range of angle in the case of the incident angle β than in the case of the incident angle α. Here, the intensity of the reflection light LT2 is greater in the case of the incident angle α than in the case of the incident angle β. It can read from this that the intensity of the reflection light LT2 retroreflected is less as the incident angle is greater. Moreover, the range of the reflection angle of the reflection light LT3 is wider as the incident angle is greater, thus increasing the diffusion component, in which case, the display quality of the aerial image may be undesirably degraded.

FIG. 5 is a diagram showing locations of the retroreflective element 20 and observers A and B with relative to each other. Here, such a case is assumed that the display device is being observed from two locations of observation located along the second direction D2. The observer A is located at an observation position OB1 and the observer B is located at an observation position OB2.

In the second direction D2, the observer A is located on a first portion P1 side and the observer B is located on a second portion P2 side. The observer A observes an image IM2 formed of the display light projected on the second portion P2. The observer B observes an image IM1 formed of the display light projected on the first portion P1. Let us focus here on the positions of the first surface SF1, the second surface SF2 and the observers A and B with relative to each other. The first surface SF1 and the second surface SF2 are arranged such that the gap L1 between the edges EG1 and EG2 along the second direction D2 in the first position PT1, which is closer to the display DSP, is greater than the gap L2 between the edges EG1 and EG2 along the second direction D2 in the second position PT2 further apart from the display DSP than the first position PT1. The first surface SF1 faces the observer B side. With this position, the area of the first surface SF1 viewable for the observer B is expanded as compared to the case where the first surface SF1 is arranged parallel to the D1-D2 plane, and the observer B can observe the image IM1 entirely without missing any part. Moreover, the second surface SF2 faces the observer A side. With this position, the area of the second surface SF2 viewable for the observer A is expanded as compared to the case where the second surface SF2 is arranged parallel to the D1-D2 plane, and the observer A can observe the image IM2 entirely without missing any part.

According to this embodiment, the first surface SF1 and the second surface SF2 are arranged to make an angle greater than 0° but less than 180°. In other words, the first surface SF1 and the second surface SF2 face in different directions. Therefore, also when the display device 1 is observed from two points, it is possible to prevent, when viewed, missing of parts of the images IM1 and IM2 in the edges EG1 and EG2 of the retroreflective element 20.

Moreover, in this embodiment, the angle of the viewable reflection light to the retroreflective element 20 is less as compared to the case where the retroreflective element 20 is arranged parallel to the D1-D3 plane. As shown in FIG. 4, the diffused light may undesirably increase more as the reflection angle is greater. Thus, according to this embodiment, it is possible to suppress the diffusion of display light by the retroreflective element 20 from being visually recognized. Therefore, the reduction of the brightness of the aerial image by scattered light can be suppressed. Moreover, the reduction of the sharpness of the aerial image by scattered light can be suppressed. As a result, degradation of the display quality can be suppressed.

Furthermore, in this embodiment, the display device DSP can form an image IM1 on one continuous first portion P1 and an image IM2 on one continuous second portion P2. That is, the images IM1 and IM2 do not overlap any of the boundaries between the first portion P1, the second portion P2 and a third portion P3 and the like in comparison with the case where the retroreflective element 20 is disposed parallel to the D1-D3 plane. Therefore, the optical properties of the retroreflective element 20, which forms the images IM1 and IM2 does not change in a discontinuous manner. Thus, the images IM1 and IM2 are formed as images having constant optical properties, making it possible to suppress the degradation of display quality.

Next, examples of the structural members will be described.

Figure 6:
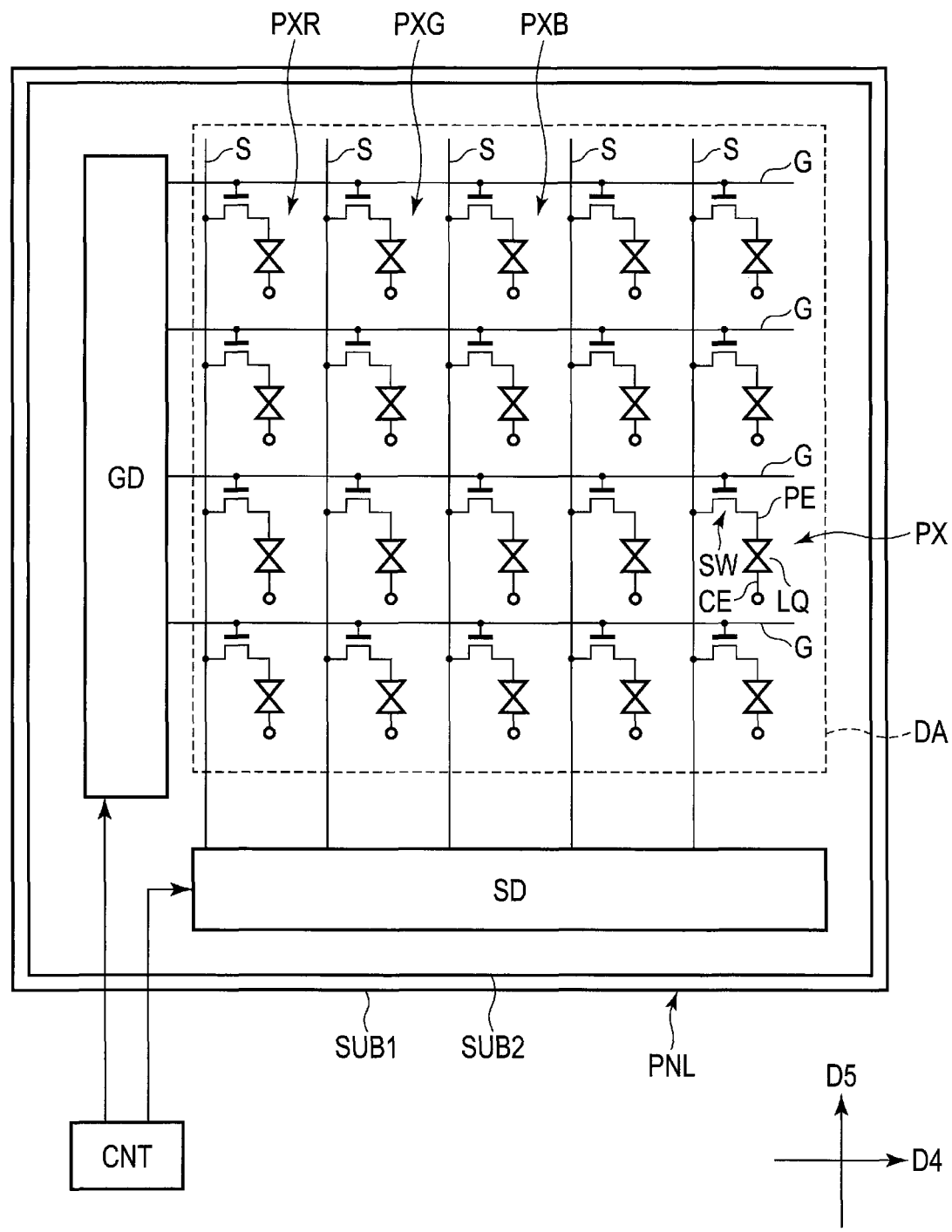
FIG. 6 is a diagram showing a configuration example of a display panel shown in FIG. 2.

FIG. 6 is a diagram showing a configuration example of the display panel PNL shown in FIG. 2. FIG. 6 illustrates a plane defined by the fourth direction D4 and the fifth direction D5 which crosses the fourth direction D4. In the example illustrated, the fourth direction D4 and the fifth direction D5 are orthogonal to each other.

Here, as an example of the display panel PNL, an active-matrix drive transmissive liquid crystal display panel will be described. That is, the display panel PNL comprises a first substrate SUB1, a second substrate SUB2 opposing the first substrate SUB1, and a liquid crystal layer LQ held between the first substrate SUB1 and the second substrate SUB2. The first substrate SUB1 and the second substrate SUB2 are attached together with a predetermined cell gap being formed therebetween. The display panel PNL comprises a display area DA which displays images. The display area DA comprises a plurality of sub-pixels PX arranged in a matrix.

The display area DA includes, as sub-pixels PX, for example, red pixels PXR which display red, green pixels PXG which display green and blue pixels PXB which display blue. The display area DA may further comprise sub pixels of colors different color from red, green or blue (that is, for example, white pixels which display white). Each pixel comprises the sub-pixels PX of the different colors to implement the color display. That is, the pixel is a minimum unit to form a color image. In the example illustrated, the pixel comprises a red pixel PXR, a green pixel PXG and a blue pixel PXB.

The red pixel PXR includes a red color filter and is configured to transmit red light mainly, of the white light from the light source device. The green pixel PXG includes a green color filter and is configured to transmit green light mainly, of the white light from the light source device. The blue pixel PXB includes a blue color filter and is configured to transmit blue light mainly, of the white light from the light source device. The color filters may be formed on the first substrate SUB1 or the second substrate SUB2, though will not be explained in detail.

The first substrate SUB1 comprises a plurality of gate lines G extending along the fourth direction D4 and a plurality of source lines S extending along the fifth direction D5 and crossing the gate lines G. Each of the gate lines G is drawn out from the display area DA and is connected to a gate driver GD. Each of the source lines S is drawn out from the display area DA and is connected to a source driver SD. The gate driver GD and the source driver SD are connected to a controller CNT. The controller CNT generates control signals, based on a video signal, to control the gate driver GD and the source driver SD.

Each of the sub-pixels PX includes a switching element SW, a pixel electrode PE, a common electrode CE and the like. The switching element SW is electrically connected to a gate line G and a source line S. The switching element SW is formed from, for example, a thin film transistor. The pixel electrode PE is electrically connected to the switching element SW. The common electrode CE opposes the pixel electrodes PE.

Though a detailed explanation on the structure of the display panel PNL will be omitted, in a display mode using a vertical electric field along the normal of the main surface of the substrate or in a display mode using an inclined electric field inclined along an oblique direction to the normal of the main surface of the substrate, the pixel electrodes PE are provided in the first substrate SUB1, whereas the common electrode CE is provided in the second substrate SUB2. In a display mode using a lateral electric field along the main surface of the substrate, both of the pixel electrodes PE and the common electrode CE are provided in the first substrate SUB1. Further, the display panel PNL may be configured to be provided for a display mode using a necessary combination of any of the above-mentioned vertical, lateral and inclined electric fields. Note here that the main surface of the substrate corresponds to a plane defined by the fourth direction D4 and the fifth direction D5.

Figure 7:
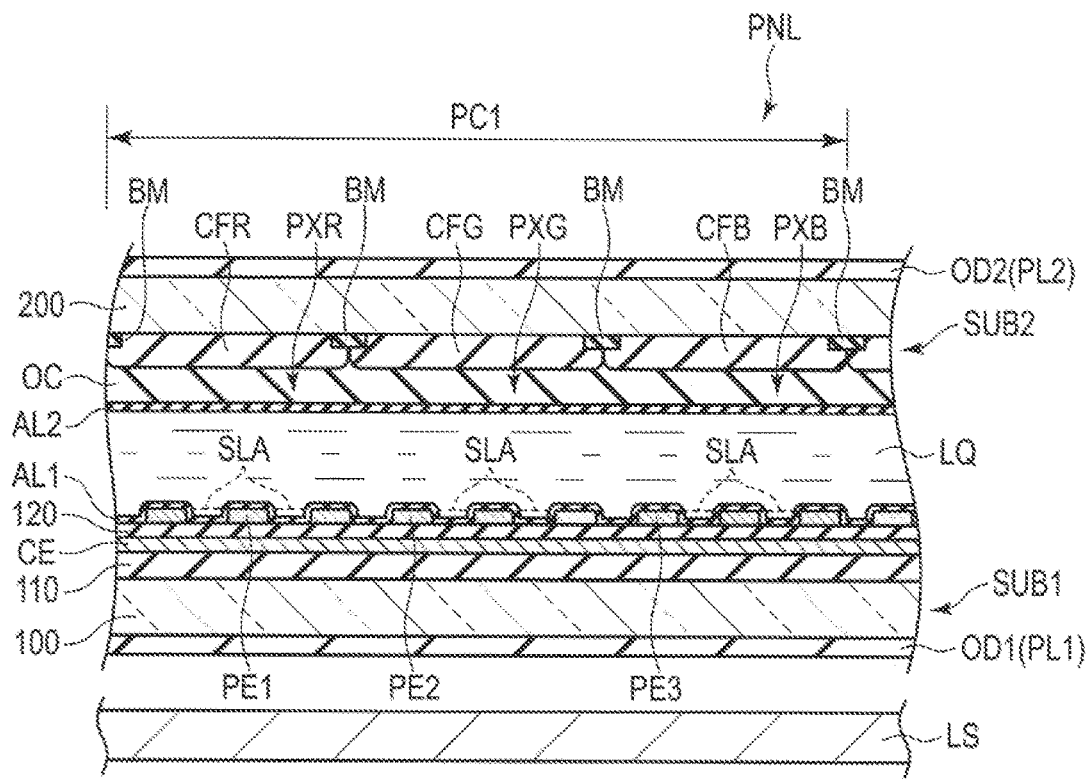
FIG. 7 is a cross section showing a configuration example of the display panel shown in FIG. 2.

FIG. 7 is a cross section showing a configuration example of the display panel PNL shown in FIG. 2. Here, a cross-sectional structure of the display panel PNL will be described briefly, to which a fringe field switching (FFS) mode, which is one of the display modes using a lateral electric field, is applied.

The first substrate SUB1 comprises a first insulating substrate 100, a first insulating film 110, a common electrode CE, a second insulating film 120, pixel electrodes PE1 to PE3, a first alignment film AL1, etc. The common electrode CE extends over from the red pixel PXR, the green pixel PXG and the blue pixel PXB. A pixel electrode PE1 of the red pixel PXR, a pixel electrode PE2 of the green pixel PXG and a pixel electrode PE3 of the blue pixel PXB each oppose the common electrode CE and comprise slits SLA. In the example illustrated, the common electrode CE is located between the first insulating film 110 and the second insulating film 120, and the pixel electrodes PE1 to PE3 are located between the second insulating film 120 and the first alignment film AL1. Note that the pixel electrodes PE1 to PE3 may be located between the first insulating film 110 and the second insulating film 120, and the common electrode CE may be located between the second insulating film 120 and the first alignment film AL1. In this case, the slits SLA are formed in the common electrode CE.

The second substrate SUB2 comprises a second insulating substrate 200, a light-shielding layer BM, color filters CFR, CFG and CFB, an overcoat layer OC, a second alignment film AL2, etc. The color filters CFR, CFG and CFB oppose the pixel electrodes PE1 to PE3, respectively, while interposing the liquid crystal layer LQ therebetween. The color filter CFR is a red color filter, the color filter CFG is a green color filter, and the color filter CFB is a blue color filter. In the example illustrated, the color filter CFR, CFG and CFB are formed in the second substrate SUB2, but they may be formed in the first substrate SUB1.

The liquid crystal layer LQ is sealed in between the first alignment film AL1 and the second alignment film AL2.

A light source device LS opposes the first substrate SUB1. As the light source LS, various forms are applicable, but a detailed explanation of the structure thereof will be omitted.

The optical element OD1 including a polarizer PL1 is disposed on an outer surface of the first insulating substrate 100. The optical element OD2 including a polarizer PL2 is disposed on an outer surface of the second insulating substrate 200. For example, the first absorption axis of the first polarizer PL1 and the second absorption axis of the second polarizer PL2 are orthogonal.

The pixels each comprising a red pixel PXR, a green pixel PXG and a blue pixel PXB are arranged at a pitch PC1.

Figure 8:
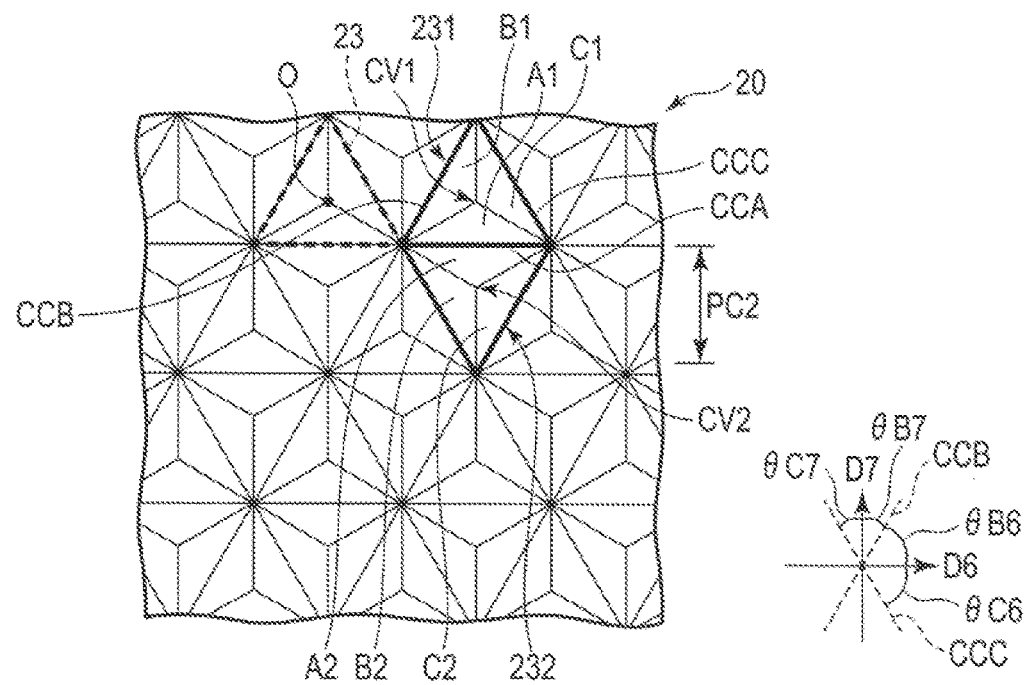
FIG. 8 is a plan view showing a configuration example of the retroreflective element shown in FIG. 2.

FIG. 8 is a plan view showing a configuration example of the retroreflective element 20 shown in FIG. 2. Here, a plan view in a plane defined by the sixth direction D6 and the seventh direction D7 orthogonal to each other is illustrated. Further, FIG. 8 shows a plan view of the retroreflective element 20 shown in FIG. 2 as viewed from the rear surface 20B side.

The retroreflective element 20 comprises a plurality of retroreflectors 23. The retroreflectors 23 retroreflect the display light. In the plan view shown, the retroreflectors 23 each have an equilateral triangular outer shape. Further, the retroreflectors 23 each have a center O projecting toward a front side of the sheet, and form a convexity CV of the rear surface 20B shown in FIG. 2. Moreover, the boundary of an adjacent retroreflector 23 is indicated a dotted line in FIG. 8 and is equivalent to a concavity CC of the rear surface 20B shown in FIG. 2. The retroreflectors 23 are arranged along the sixth direction D6. Further, the retroreflectors 23 are arranged at a pitch PC2 in the seventh direction D7. Note that any pair of the retroreflectors 23 adjacent to each other in the sixth direction D6 and the seventh direction D7, respectively, have shapes reversed by 180 degrees with respect to each other.

The retroreflector 231 in the figure comprises three reflective surfaces A1, B1 and C1 orthogonal to each other. The retroreflector 231 comprises a convexity CV1 surrounded by the reflective surfaces A1, B1 and C1. The retroreflector 231 and the retroreflector 232 are arranged along the seventh direction D7. The retroreflector 232 comprises three reflective surfaces A2, B2 and C2 orthogonal to each other. The retroreflector 232 comprises a convexity CV2 surrounded by the reflective surfaces A2, B2 and C2. The intersection between the reflective surface A1 of the retroreflector 231 and the reflective surface A2 of the retroreflector 232 forms a concavity CCA of the rear surface 20B. The concavity CCA extends along a direction parallel to the sixth direction D6. The retroreflector 231 and the retroreflector 232 are located to be line-symmetrical with respect to the concavity CCA. Similarly, the boundary portion of any pair of retroreflectors 23 adjacent to each other is equivalent to a concavity. That is, each of the outer shapes (triangles) of the retroreflector 23 is defined by concavities. The outer shape of the retroreflector 231 is defined by the concavities CCA, CCB and CCC. The concavities CCB and CCC each extend in a direction crossing each of the sixth direction D6 and the seventh direction D7. For example, an angle θB6 of the extending direction of the concavity CCB with the sixth direction D6 is 60 degrees, and an angle θB7 thereof with the seventh direction D7 is 30 degrees. An angle θC6 of the extending direction of the concavity CCC with the sixth direction D6 is 60 degrees, and an angle θC7 thereof with the seventh direction D7 is 30 degrees.

The resolution of the aerial image I1 is dependent on the pitch PC2 of the retroreflectors 23. In order to suppress degradation of resolution, the pitch PC2 should desirably be less than pitch PC1 of the pixels in the display panel PNL shown in FIG. 7.

Figure 9:
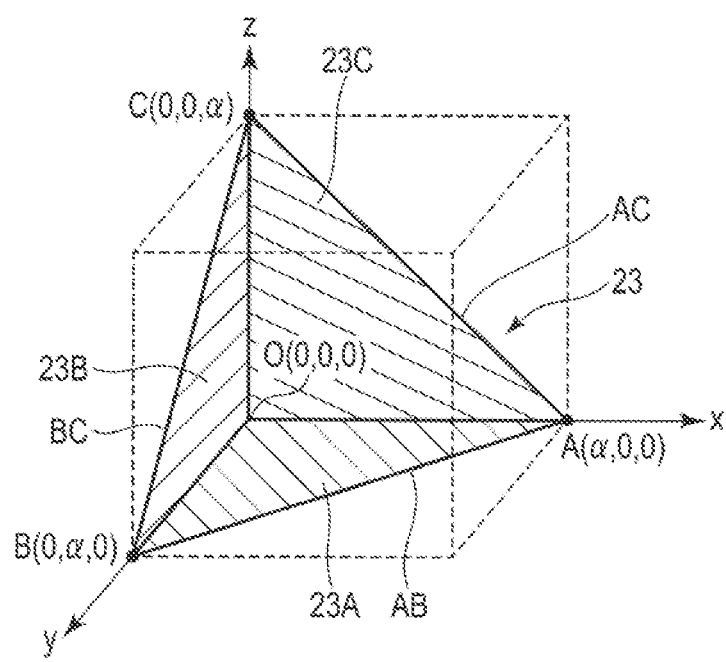
FIG. 9 is a perspective view showing a configuration example of a retroreflector shown in FIG. 8.

FIG. 9 is a perspective view showing a configuration example of the retroreflector 23 shown in FIG. 8. Here, the shape of the retroreflector 23 will be described by applying the xyz coordinate systems orthogonal to each other.

That is, the retroreflector 23 comprises three reflective surfaces 23A, 23B and 23C in the xyz coordinate system. These reflective surfaces 23A to 23C are all of an identical shape, a right-angled isosceles triangle. Further, these reflective surfaces 23A to 23C are orthogonal to each other. The retroreflector 23 which comprises the reflective surfaces 23A to 23C of such a shape is called, for example, a corner cube or a corner reflector.

When a point A on the x-axis is represented by ($\alpha$, 0, 0), a point B on the y-axis is represented by (0, $\alpha$, 0) and a point C on the z axis is represented by (0, 0, $\alpha$), the reflective surface 23A is formed on an x-y plane and is defined by the center O, point A and point B. Further, the reflective surface 23B is formed on a y-z plane and is defined by the center O, point B and point C. The reflective surface 23C is formed on an x-z plane and is defined by the center O, point A and point C. A line segment AB which connects the point A and point B, a line segment AC which connects the point A and point C, and a line segment BC which connects the point B and point C reach correspond to a concavity.

The retroreflector 23 can realize retroreflection of incidence light, which reflects the incidence light substantially in the same optical path thereof by reflecting the incidence light on each of the three reflective surfaces 23A to 23C. A portion near the center O, where the three reflective surfaces cross orthogonal with each other corresponds to a retroreflective portion. Moreover, A portion near the three points A, B and C, where two reflective surfaces cross orthogonal to each other can serve as a non-retro reflective portion (not reflected by the three reflective surfaces), which does not retroreflect.

Figure 10:
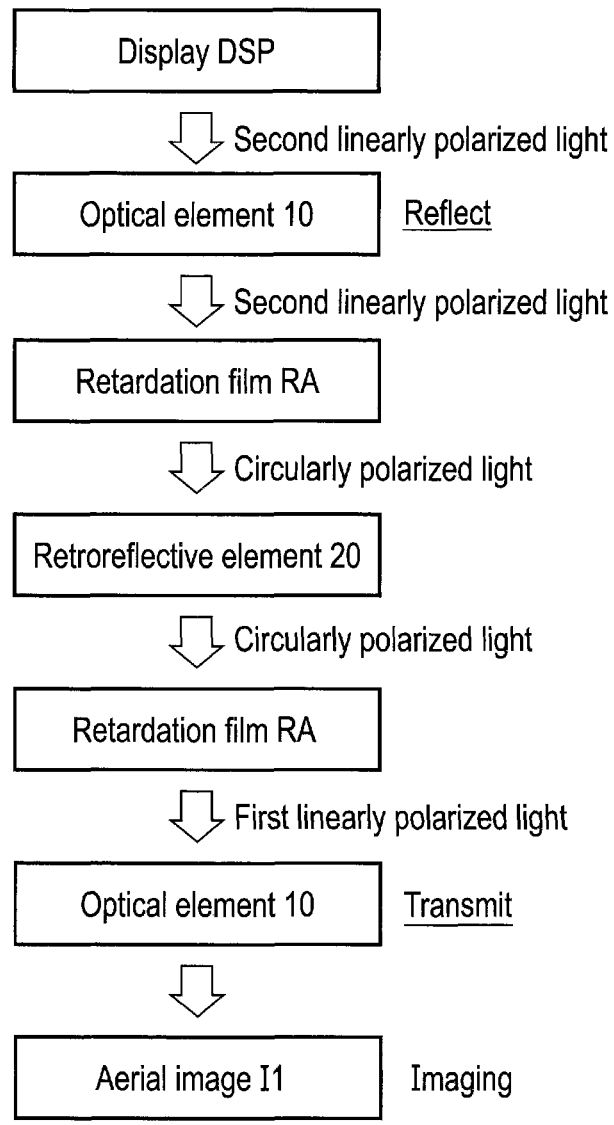
FIG. 10 is a diagram illustrating the function of each component of the display device.

FIG. 10 is a diagram illustrating the functions of the structural members which constitute the display device 1. Here, the optical path of display light emitted from the display DSP will be described with reference to FIG. 2.

The display DSP emits a second linearly polarized light equivalent to the display light of the display image I0. The second linearly polarized light here comprises a plane of polarization which crosses the transmission axis of the optical element 10 and corresponds to the linearly polarized light reflected by the optical element 10.

The second linearly polarized light reflected by the optical element 10 passes through the retardation film RA and is converted into circularly polarized light. Note that the term "circularly polarized light" used in this embodiment also includes elliptically polarized light. The circularly polarized light enters the retroreflective element 20 and is reflected three times respectively by the reflective surfaces 23A to 23C such as shown in FIG. 9. That is, the circularly polarized light entering the retroreflective element 20 is retroreflected. The reflection light thus retroreflected is circularly polarized light. Then, the circularly polarized light again passes through the retardation film RA and is converted into the first linearly polarized light. The first linearly polarized light passes through the optical element 10 and is imaged as the aerial image I1 representing the display image I0. The observer can observe the aerial image I1 which appears in the air from a direction opposite to a traveling direction of the first linearly polarized light having passed the optical element 10.

Figure 11:
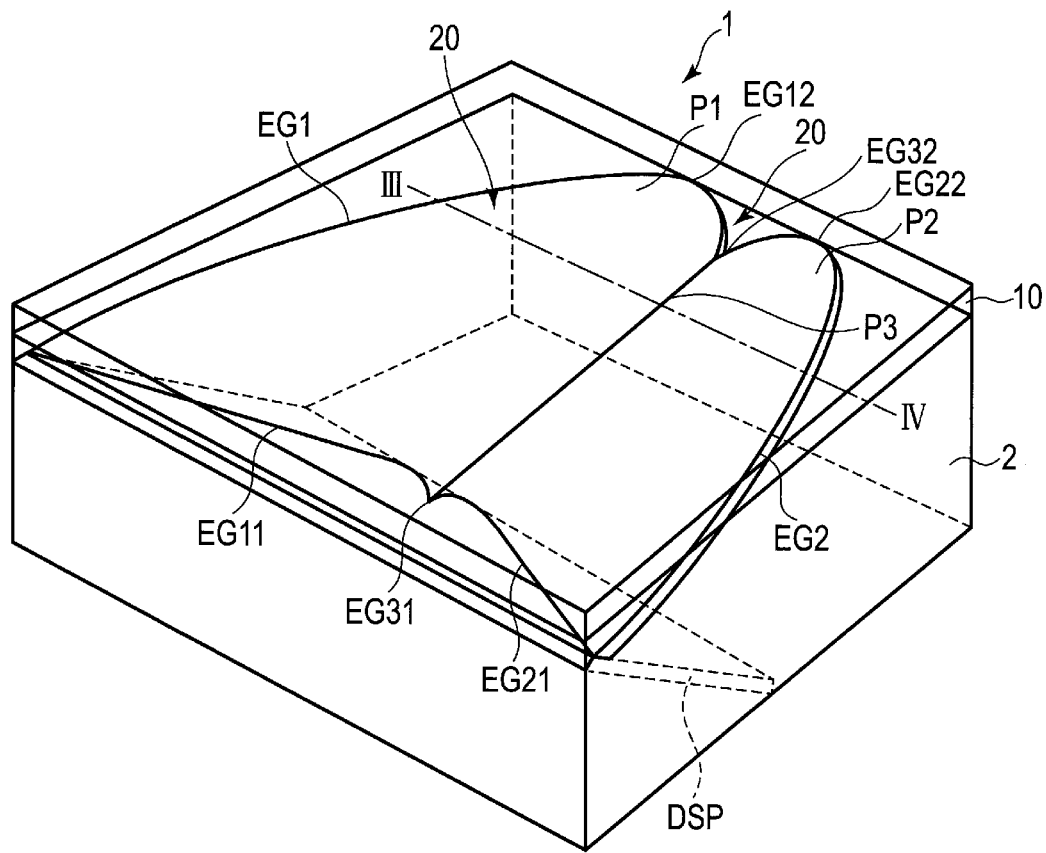
FIG. 11 is a diagram showing an example of the retroreflective element according to this embodiment.
Figure 11:
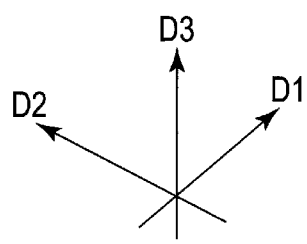

FIG. 11 is a diagram showing an example of the retroreflective element 20 according to this embodiment. FIG. 11 is different from FIG. 1 in the shape of the retroreflective element 20.

The retroreflective element 20 comprises a first portion P1, a second portion P2 and a third portion P3 between the first portion P1 and the second portion P2. In the D2-D3 plane, the first portion P1 and the second portion P2 are formed as concavities which recess downward and the third portion P3 is formed as a convexity projecting upward, as will be described later.

The edges EG11 and EG21 may be in contact with the display DSP. Further, the edges EG12 and EG22 may be in contact with the housing 2. The third portion P3 includes an edge EG31 on a side of the display DSP and an edge EG32 on opposite side to the display DSP side. The edge EG31 may be in contact with the display DSP. The edge EG32 is spaced apart from the housing 2, for example. Further, in the example shown in FIG. 11, each of the edge EG1 and edge EG2 is formed into a single curve.

The first portion P1, the second portion P2 and the third portion P3 are each curved along the first direction D1. That is, the first portion P1, the second portion P2 and the third portion P3 each have a curved cross section along the D1-D3 plane. Note that the first portion P1, the second portion P2 and the third portion P3 may each have a straight cross section along the D1-D3 plane.

The display DSP is configured to emit display light in a region between the edge EG11, edge EG21 and edge EG31, and comprises a display panel and the like, which emit display light from between the edge EG11, edge EG21 and edge EG31.

FIG. 12 is a cross section showing the structure of the retroreflective element 20 taken along line III-IV shown in FIG. 11.

The first portion P1 and the second portion P2 are formed into concavities. The third portion P3 is formed into a convexity. The first portion P1, the third portion P3 and the second portion P2 are arranged in this order along the second direction D2.

The first portion P1 includes the edge (first edge) EG1 on a side of the optical element 10 with regard to the third portion P3, and the second portion P2 includes the edge (second edge) EG2 on the optical element 10 side with regard to the third portion P3. The edges EG1 and EG2 are arranged with a gap therebetween along the second direction D2. Here, the gap L1 between the edge EG1 and edge EG2 along the second direction D2 is greater than the width W of the third portion P3 along the second direction D2.

In an example shown in FIG. 12, the tips of the convexities CV are aligned on a curved surface CS in the rear surface 20B. With this structure, the rear surface 20B can be regarded as a curved surface. Further, even if the front surface 20A is an uneven surface, the tips of the convexities CV are aligned on a curved surface, the front surface 20A is regarded as a curved surface as will be described later.

In such an embodiment as well, an advantageous effect similar to that described above can be obtained.

FIG. 13 is a cross section showing an example of the retroreflective element 20. FIG. 13 shows an example of the retroreflective element 20 according to this embodiment and is a cross section showing another example different from that of FIG. 12.

In the example illustrated, the first portion P1 and the second portion P2 are formed into concavities, and the third portion P3 is formed into a flat plate.

In such an embodiment as well, an advantageous effect similar to that described above can be obtained.

FIG. 14 is a cross section showing an example of the retroreflective element 20. FIG. 14 shows an example of the retroreflective element 20 according to this embodiment and is a cross section showing another example different from that of FIG. 12.

In the example illustrated, the first portion P1, and the second portion P2 are formed into concavities and the third portion P3 is formed into a convexity towards below.

In such an embodiment as well, an advantageous effect similar to that described above can be obtained.

FIG. 15 is a diagram showing an example of the retroreflective element 20 according to this embodiment. FIG. 15 is different from FIG. 1 in that the retroreflective element 20 comprises a polygonal third portion P3.

The third portion P3 is triangular in the D1-D2 plane. Further, the third portion P2 comprises a third surface SF3 on a side opposing the optical element 10. The third surface SF3 is inclined to face toward the display DSP with respect to the D1-D2 plane. The third portion P3 includes an edge EG31 on a side of the display DSP and an edge EG32 on an opposite side to the display DSP. The edge EG31 may be in contact with the display DSP. The edge EG32 may be in contact with the housing 2. The edge EG31 is formed into approximately straight.

In the example shown in FIG. 15, the first surface SF1 and the second surface SF2 are in contact with the edge EG32, and the angle made between the first surface SF1 and the second surface SF2 in the edge EG32 should only be greater than 0° and less than 180°.

The display DSP is configured to emit display light in a region between edges EG11, EG21 and EG31, and comprises a display panel and the like, which emit display light from between the edges EG11, EG21 and EG31, for example.

Figure 16:
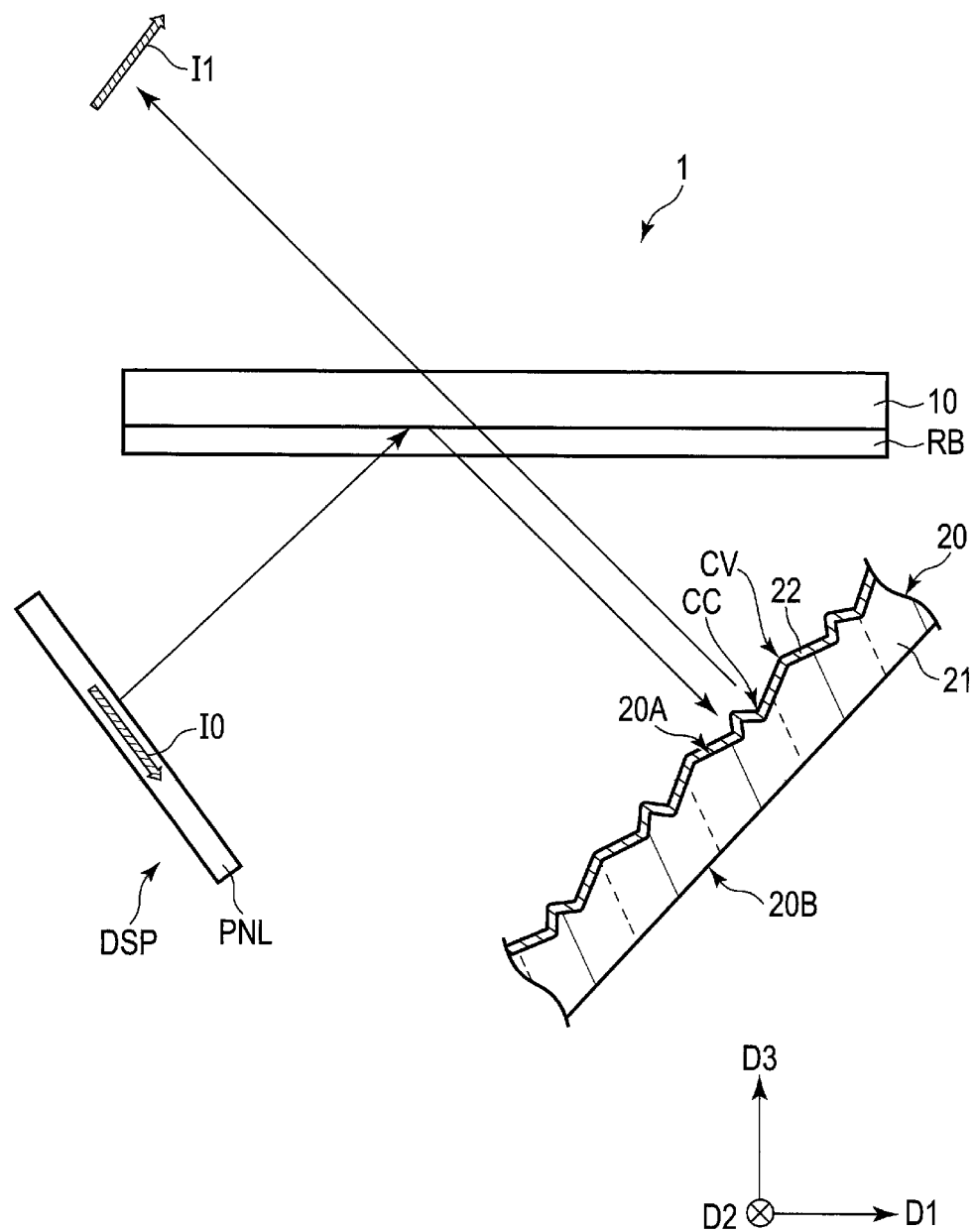
FIG. 16 is a schematic diagram showing the relationship of members of the display device shown in FIG. 1.

FIG. 16 is a schematic diagram showing an example of the relationship between the structural members of the display device 1 shown in FIG. 1. FIG. 16 is different from FIG. 2 mainly in the structure of the retroreflective element 20. A front surface 20A is a uneven surface which includes concavities CC and convexities CV. The convexities CV project toward the optical element 10. The rear surface 20B is a flat surface. The uneven surface is covered by the reflective film 22. That is, most incidence light entering the retroreflective element 20 is retroreflected or scattered by the front surface 20A without passing through the front surface 20A. The reflective film 22 is formed from, for example, a material exhibiting light reflectivity, such as silver (Ag), aluminum (Al), an aluminum alloy or the like, to have a uniform thickness. Further, the reflective film may be subjected to a surface treatment for preventing the corrosion, or may be coated with an inorganic material such as silicon nitride (SiN).

In the structure shown in FIG. 16, the display DSP emits circularly polarized display light toward the optical element 10. In other words, the display panel PNL emits display light representing the display image I0 and here, the display light is circularly polarized.

The retardation film RB is disposed approximately parallel to the optical element 10. The retardation film RB employed here is, for example, a λ/4 plate, which imparts a phase difference of approximately λ/4 to the transmission light. Here, λ is the wavelength of the transmission light. The retardation film RB is disposed such that the slow axis thereof may cross at an angle of 45° to the plane of polarization of linearly polarized light, though a detail description will be omitted here.

In the example illustrated, the retardation film RB is adhered to the optical element 10, but it may be disposed to be spaced from the optical element 10.

In such an embodiment as well, an advantageous effect similar to that described above can be obtained.

FIG. 17 is a diagram illustrating the function of each of the structural members which constitute the display device 1 shown in FIG. 16. Here, an optical path of display light emitted from the display DSP will be described with reference to FIG. 16.

The display DSP emits circularly polarized light corresponding to the display light of the display image I0. The circularly polarized light passes through the retardation film RB and is converted into the second linearly polarized light.

The second linearly polarized light reflected in the optical element 10 again passes through the retardation film RB and is converted into circularly polarized light. The circularly polarized light enters the retroreflective element 20 and is reflected three times respectively by reflective surfaces 23A to 23C such as shown in FIG. 9. That is, the circularly polarized light entering the retroreflective element 20 is retroreflected. The reflection light thus retroreflected is circularly polarized light. Then, the circularly polarized light again passes through the retardation film RB, and is converted into the first linearly polarized light. The first linearly polarized light passes through the optical element 10 and is imaged as an aerial image I1 representing a display image I0. The observer can observe the aerial image I1 which appears in the air from a direction opposing the traveling direction of the first linearly polarized light having passed through the optical element 10.

In such an embodiment as well, an advantageous effect similar to that described above can be obtained.

As described above, according to this embodiment, a display device which can suppress degradation of the display quality can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Examples of the illumination device and the liquid crystal display which are obtained from the structures disclosed in the specification will be appended.

(1) A display device comprising:
a display which emits display light;
an optical element comprising a transmission axis which transmit first linearly polarized light, which reflects second linearly polarized light crossing the transmission axis; and
a retroreflective element which retroreflects the display light,
the retroreflective element comprising:
a first portion comprising a first surface;
a second portion comprising a second surface; and
a third portion disposed between the first surface and the second surface, wherein
an angle made by the first surface and the second surface is greater than 0° and less than 180°.

(2) The display device according to item (1), wherein
the display and the retroreflective element are arranged along a first direction, and an angle made between the display and the retroreflective element is greater than 0° and less than 180°, and
the first surface and the second surface are arranged along a second direction crossing the first direction, and an angle made between the first surface and the second surface is an acute angle.

(3) The display device according to item (1) or (2), wherein
the third portion is linear shape or polygonal.

(4) The display device according to item (1), wherein
the first portion includes a first edge on a side of the optical element with regard to the third portion,
the second portion includes a second edge on a side of the optical element with regard to the third portion,
the first edge and the second edge are aligned along the second direction, and
a first gap along the second direction between the first edge and the second edge in a first position is greater than a second gap along the second direction between the first edge and the second edge in a second position spaced further from the display than the first position.

(5) The display device according to item (4), wherein the first gap is a greater than a width of the third portion along the second direction.

(6) The display device according to item (4), wherein each of the first edge and the second edge has a single straight shape or a single curve.

(7) The display device according to item (1), wherein the first surface has an area of about 40% or greater of that of the retroreflective element, and the second surface has an area of about 40% or greater of that of the retroreflective element.

(8) A display device comprising:
a display which emits display light;
an optical element comprising a transmission axis which transmit first linearly polarized light, which reflects second linearly polarized light crossing the transmission axis, and
a retroreflective element which retroreflects the display light;
the retroreflective element comprising:
a concave first portion and a concave second portion, and
a convex third portion disposed between the first portion and the second portion.

(9) The display device according to item (8), wherein the display and the retroreflective element are arranged along a first direction, and an angle made between the display and the retroreflective element is greater than 0° and less than 180°, and
the first portion, the third portion and the second portion are arranged in this order along a second direction crossing the first direction.

(10) The display device according to item (8), wherein the first portion includes a first edge on a side of the optical element with regard to the third portion,
the second portion includes a second edge on a side of the optical element with regard to the third portion,
the first edge and the second edge are arranged along the second direction, and
a first gap along the second direction between the first edge and the second edge in a first position is greater than a second gap along the second direction between the first edge and the second edge in a second position spaced further from the display than the first position.

(11) The display device according to item (10), wherein the first gap is a greater than a width of the third portion along the second direction.

(12) The display device according to item (10), wherein each of the first edge and the second edge is formed into a single straight shape or a single curve.

(13) The display device according to item (8), wherein the first surface has an area of about 40% or greater of that of the retroreflective element, and the second surface has an area of about 40% or greater of that of the retroreflective element.

(14) A display device comprising:
a display which emits display light;
an optical element comprising a transmission axis which transmit first linearly polarized light, which reflects second linearly polarized light crossing the transmission axis; and
a retroreflective element which retroreflects the display light,
the retroreflective element comprising:
a first portion comprising a first surface; and
a second portion comprising a second surface,
the first surface and the second surface crossing in a straight portion, and
wherein an angle made by the first surface and the second surface is greater than 0° and less than 180°.

(15) The display device according to item (14), wherein the display and the retroreflective element are arranged along a first direction, and an angle made between the display and the retroreflective element is greater than 0° and less than 180°, and
the first surface and the second surface are arranged along a second direction crossing the first direction, and an angle made between the first surface and the second surface is an acute angle.

(16) The display device according to item (14), wherein the first portion includes a first edge on a side of the optical element with regard to the straight portion,
the second portion includes a second edge on a side of the optical element with regard to the straight portion,
the first edge and the second edge are arranged along the second direction, and
a first gap along the second direction between the first edge and the second edge in a first position is greater than a second gap along the second direction between the first edge and the second edge in a second position spaced further from the display than the first position.

(17) The display device according to item (16), wherein each of the first edge and the second edge has a single straight shape or a single curve.

(18) The display device according to item (14), wherein the first surface has an area of about 40% or greater of that of the retroreflective element, and the second surface has an area of about 40% or greater of that of the retroreflective element.

(19) A display device comprising:
a display which emits display light;
an optical element comprising a transmission axis which transmit first linearly polarized light and reflecting second linearly polarized light crossing the transmission axis; and
a retroreflective element which retroreflects the display light,
the retroreflective element comprising:
a first portion comprising a first surface;
a second portion comprising a second surface; and
a third portion provided between the first surface and the second surface and comprising a polygonal third surface,
wherein an angle made between the first surface and the second surface is greater than 0° and less than 180°.

(20) The display device according to item (19), wherein the display and the retroreflective element are arranged along a first direction, and an angle made between the display and the retroreflective element is greater than 0° and less than 180°, and
the first surface and the second surface are arranged along a second direction crossing the first direction, and an angle made between the first surface and the second surface is an acute angle.

What is claimed is:
1. A display device comprising:
a display which emits display light;
an optical element comprising a transmission axis which transmits first linearly polarized light, which reflects second linearly polarized light crossing the transmission axis; and
a retroreflective element which retroreflects the display light,
the retroreflective element comprising:
a first portion comprising a first surface; and
a second portion comprising a second surface; and a third portion disposed between the first surface and the second surface, wherein an angle made by the first surface and the second surface is greater than 0° and less than 180°, the display and the retroreflective element are arranged along a first direction, and an angle made between the display and the retroreflective element is greater than 0° and less than 180°, the first surface and the second surface are arranged along a second direction crossing the first direction, and an angle made between the first surface and the second surface is an acute angle, the first portion includes a first edge on a side of the optical element with regard to the third portion, the second portion includes a second edge on a side of the optical element with regard to the third portion, the first edge and the second edge are aligned along the second direction, and a first gap along the second direction between the first edge and the second edge in a first position is greater than a second gap along the second direction between the first edge and the second edge in a second position spaced further from the display than the first position.

2. The display device according to claim 1, wherein the third portion is linear shape or polygonal.

3. The display device according to claim 1, wherein the first gap is a greater than a width of the third portion along the second direction.

4. The display device according to claim 1, wherein each of the first edge and the second edge has a single straight shape or a single curve.

5. The display device according to claim 1, wherein the first surface has an area of about 40% or greater of that of the retroreflective element, and the second surface has an area of about 40% or greater of that of the retroreflective element.

6. A display device comprising:

a display which emits display light;

an optical element comprising a transmission axis which transmits first linearly polarized light, which reflects second linearly polarized light crossing the transmission axis; and a retroreflective element which retroreffects the display light, the retroreflective element comprising:

a concave first portion and a concave second portion, and a convex third portion disposed between the concave first portion and the concave second portion, wherein the concave first portion and the concave second portion are arranged symmetrically with respect to the convex third portion, the display and the retroreflective element are arranged along a first direction, and an angle made between the display and the retroreflective element is greater than 0° and less than 180°, the concave first portion, the convex third portion, and the concave second portion are arranged in this order along a second direction crossing the first direction, the concave first portion includes a first edge on a side of the optical element with regard to the convex third portion, the concave second portion includes a second edge on a side of the optical element with regard to the convex third portion, the first edge and the second edge are arranged along the second direction, and a first gap along the second direction between the first edge and the second edge in a first position is greater than a second gap along the second direction between the first edge and the second edge in a second position spaced further from the display than the first position.

7. The display device according to claim 6, wherein the first gap is a greater than a width of the convex third portion along the second direction.

8. The display device according to claim 6, wherein each of the first edge and the second edge is formed into a single straight shape or a single curve.

9. A display device comprising:

a display which emits display light;

an optical element comprising a transmission axis which transmits first linearly polarized light, which reflects second linearly polarized light crossing the transmission axis; and a retroreflective element which retroreflects the display light, the retroreflective element comprising: a first portion comprising a first surface; and a second portion comprising a second surface, the first surface and the second surface crossing in a straight portion, wherein an angle made by the first surface and the second surface is greater than 0° and less than 180°, the display and the retroreflective element are arranged along a first direction, and an angle made between the display and the retroreflective element is greater than 0° and less than 180°, the first surface and the second surface are arranged along a second direction crossing the first direction, and an angle made between the first surface and the second surface is an acute angle, the first portion includes a first edge on a side of the optical element with regard to the straight portion, the second portion includes a second edge on a side of the optical element with regard to the straight portion, the first edge and the second edge are arranged along the second direction, and a first gap along the second direction between the first edge and the second edge in a first position is greater than a second gap along the second direction between the first edge and the second edge in a second position spaced further from the display than the first position.

10. The display device according to claim 9, wherein each of the first edge and the second edge has a single straight shape or a single curve.

11. The display device according to claim 9, wherein the first surface has an area of about 40% or greater of that of the retroreflective element, and the second surface has an area of about 40% or greater of that of the retroreflective element.

* * * * *